Sept. 2, 1924.
J. DINES
GIN LEG
1,507,471
Filed Feb. 26, 1923    2 Sheets-Sheet 1
Fig.1.
Fig.2.
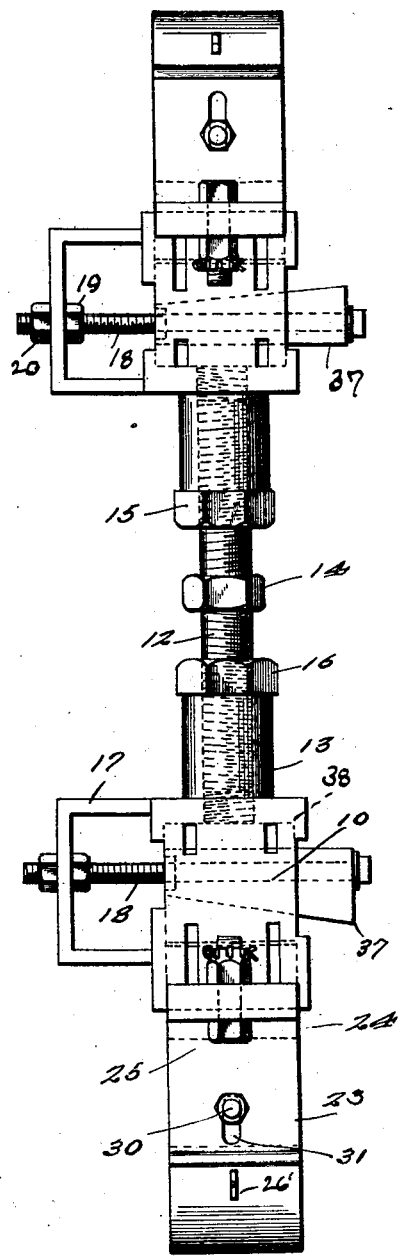
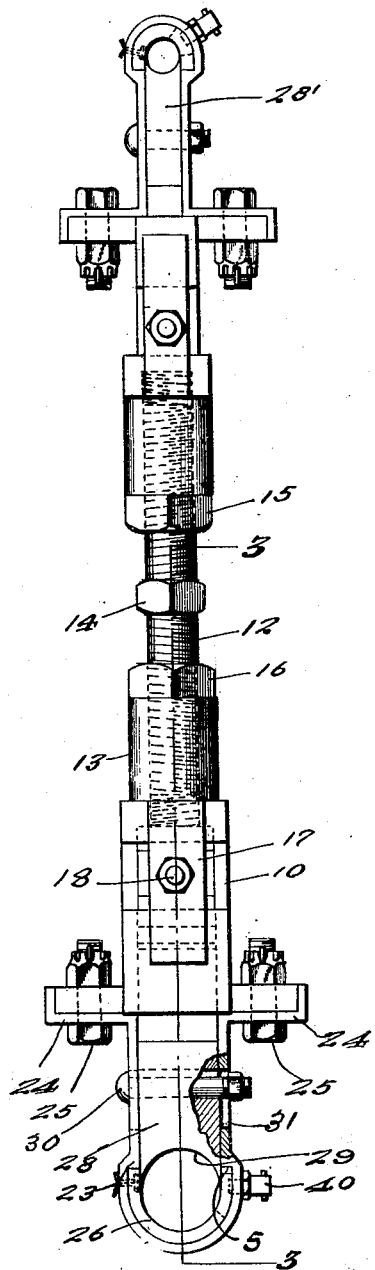
Joe Dines INVENTOR

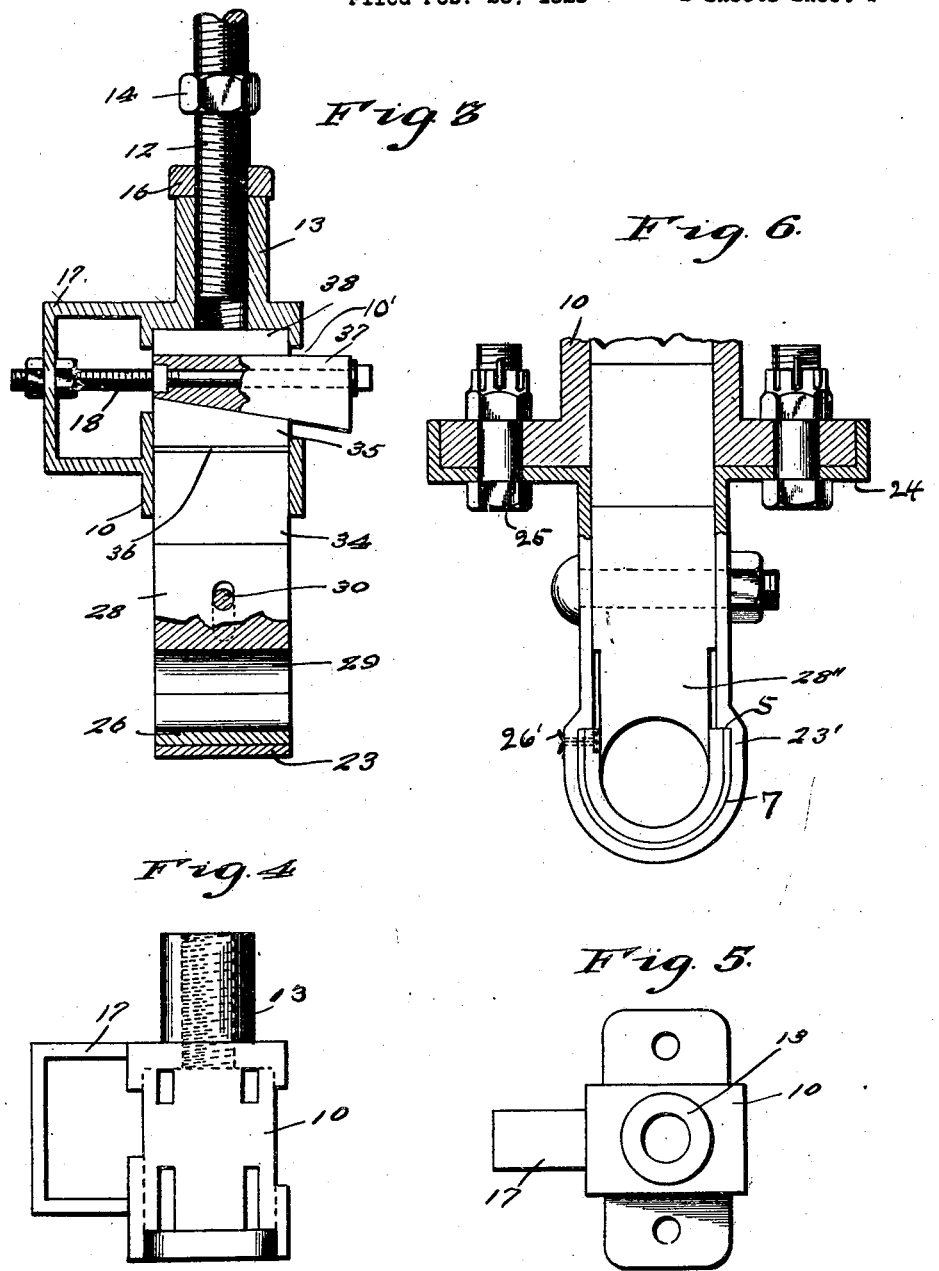

Patented Sept. 2, 1924.

1,507,471

UNITED STATES PATENT OFFICE.

JOE DINES, OF TEMPE, ARIZONA.

GIN LEG.

Application filed February 26, 1923. Serial No. 621,493.

*To all whom it may concern:*

Be it known that I, JOE DINES, a citizen of the United States, residing at Tempe, in the county of Maricopa and State of Arizona, have invented new and useful Improvements in Gin Legs, of which the following is a specification.

This invention relates to an adjusting leg for the knife of a roller type gin stand, one object being to prevent variation in the length of the leg after adjustment has once been effected, special provision being made for adjustment due to wear.

With the foregoing and other objects in view, the invention consists in the novel construction and arrangement of elements described, illustrated and claimed, it being understood that modifications may be made within the scope of the claims without departing from the spirit of the invention.

In the drawings, Figures 1 and 2 show the complete device, from different sides; Figure 3 is a section on line 3—3 of Figure 2; Figures 4 and 5 are detail views of the device in which the adjusting wedge is mounted; Figure 6 is a detail view showing the mounting of a reduced bearing block and its relation to a U-shaped inclosing member having a spacing element therein.

In carrying out the invention, I provide a one piece casting 10, preferably of aluminum, for connection with each end of an adjusting rod 12, the ends of the rod being provided with right and left hand threads entering threaded sockets 13 formed on the casting. The rod is provided with an angular central portion 14 by means of which it is rotated for effecting adjustment, and lock nuts are designated 15 and 16.

The castings 10 are of the form shown in detail in Figures 1 and 3, and each casting includes an extension 17 through which a wedge adjusting rod 18 passes, the rod being retained by lock nut 19 and by nut 20 at the end thereof.

A U-shaped element 23 of steel is provided with laterally and upwardly extending ears 24 and is secured by bolts 25 to each casting 10. The element 23 encloses a correspondingly shaped element 26 formed of so-called "Never-burn" brake lining, and a bearing block 28 has a concave socket 29 and is retained in position by means of a bolt 30 passing through slot 31. Each element 23 is offset to form shoulders 5 against which the ends of the lining 26 abut, and a rivet 26' prevents the lining from slipping.

This provides for an adjustment of three-eighths of an inch, due to wear on the block. A rectangular block 34 is located as shown, and a tapered block 35 is separated therefrom by a shim 36. Cooperating with this tapered block is a wedge 37, through which adjusting rod 18 passes, and an additional block 38 is located on the opposite side of the wedge. The casting 10 is provided with slot 10' leaving a space of an inch as shown, for removing the shim and the tapered block.

This arrangement is duplicated in the other casting 10, it being understood that the two legs of this construction are employed for each moving knife. The other U-element of the particular leg under discussion accommodates a crank shaft between the lining and the bearing block 28'. The block may be reduced in thickness as shown in a separate view at 28", if the crank shaft has become considerably worn, and in that event the U-element 23' will be formed or attached in such manner as to provide less space between the parallel walls thereof, in order to fit the block snugly. The element 23' of resilient steel readily accommodates itself either to a worn crank or a new shaft of less diameter than that usually employed. A grease cup is shown at 40.

It may be added that the casing 10 constitutes a type of frame for mounting the wedges and the associated elements, and hence the elements 28 and 28' and the inclosed devices will be referred to as a two-part bearing. In the case of a worn crank shaft, a sub-lining, or additional strip 7, is employed as a spacing element.

What is claimed is:—

1. In a device of the class described, a rod, wedge mounting means adjustably connected therewith, a U-shaped member connected with the mounting means, a bearing block having a concaved portion cooperating with the central portion of the U-member, to provide a bearing, means transmitting pressure from the wedge to the block, and means for adjusting the wedge transversely of the block and rod, said bearing block being cut away at the sides thereof permitting the elements of the U-member to approach each other under pressure, for taking up wear.

2. In a device of the class described, a rod, a frame including a socket portion having adjustable connection with the rod, a two-part bearing element connected with the frame, one of the parts being adjustable, a wedge adjustable transversely of the frame and rod, means for locking the wedge in an adjusted position, and means interposed between the adjustable element of the bearing and the wedge for transmitting pressure to said elements of the bearing, said locking means including an apertured stationary element, a threaded device connected with the wedge and passing through the stationary element, and nuts engaging the threaded device and contacting with the stationary element on opposite sides thereof.

3. In a device of the class described, a rod, a frame including a socket portion having adjustable connection with the rod, a wedge adjustable transversely of the frame and rod, spaced elements on opposite sides of the wedge, a bearing block adjustable upon the transverse movement of the wedge, means inclosing the bearing block and cooperating with one end thereof for forming a complete bearing, an extension carried by the frame, an adjustable rod passing through the wedge and through said extension, and means engaging the rod and extension for maintaining the adjustment of the wedge.

In testimony whereof I affix my signature.

JOE DINES.